US009747459B2

(12) United States Patent
Faitelson et al.

(10) Patent No.: US 9,747,459 B2
(45) Date of Patent: *Aug. 29, 2017

(54) METHOD AND APPARATUS FOR REQUESTING ACCESS TO FILES

(75) Inventors: Yakov Faitelson, Elkana (IL); Ohad Korkus, Herzeliya (IL); David Bass, Karmei Yosef (IL)

(73) Assignee: VARONIS SYSTEMS, INC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/437,004

(22) Filed: Apr. 2, 2012

(65) Prior Publication Data

US 2013/0263275 A1    Oct. 3, 2013

(51) Int. Cl.
G06F 7/04        (2006.01)
G06F 21/60       (2013.01)
G06F 17/30       (2006.01)

(52) U.S. Cl.
CPC .................................. G06F 21/604 (2013.01)

(58) Field of Classification Search
CPC .... G06F 21/604; G06F 21/62; G06F 21/6218; G06F 17/30321; G06F 17/30528; G06F 17/3053; G06F 17/30554; G06F 17/30867; G06F 2221/2141; G06F 2221/2145; H04L 63/101; H04L 63/102; H04L 65/403
USPC .......................................................... 726/26
See application file for complete search history.

(56) References Cited

U.S. PATENT DOCUMENTS

| | | | |
|---|---|---|---|
| 7,308,498 B1* | 12/2007 | Olsen et al. ................. 709/225 |
| 8,107,100 B2* | 1/2012 | Abraham et al. ........... 358/1.14 |
| 8,190,754 B2* | 5/2012 | Strickland .................... 709/229 |
| 8,938,669 B1* | 1/2015 | Cohen .................... G06F 17/24 709/204 |
| 2003/0037119 A1* | 2/2003 | Austin ........................ 709/217 |
| 2005/0138104 A1* | 6/2005 | Houh et al. ................. 709/200 |
| 2005/0192822 A1* | 9/2005 | Hartenstein et al. ............. 705/1 |
| 2005/0232423 A1* | 10/2005 | Horvitz ................. G06Q 10/10 380/255 |
| 2006/0064394 A1* | 3/2006 | Dettinger et al. ................ 707/1 |
| 2006/0080278 A1* | 4/2006 | Neiditsch ............. G06Q 10/107 |
| 2006/0206464 A1* | 9/2006 | Marukawa ........................ 707/3 |
| 2006/0224735 A1* | 10/2006 | Hill ........................ H04L 12/58 709/225 |
| 2006/0259585 A1* | 11/2006 | Keohane et al. ............. 709/219 |
| 2007/0214144 A1* | 9/2007 | Lawson .............. G06F 21/6218 |
| 2007/0282802 A1* | 12/2007 | Wilhelm ........... G06F 17/30884 |
| 2008/0005806 A1* | 1/2008 | Alve ............................... 726/30 |
| 2008/0018926 A1* | 1/2008 | Abraham et al. ............ 358/1.15 |
| 2008/0034437 A1* | 2/2008 | Patterson ........................ 726/26 |
| 2008/0040653 A1* | 2/2008 | Levine ........................ 715/205 |
| 2008/0109912 A1* | 5/2008 | Rivera ................... H04L 63/20 726/30 |
| 2008/0148310 A1* | 6/2008 | Strickland ....................... 725/30 |

(Continued)

FOREIGN PATENT DOCUMENTS

CN         102265579         11/2011

*Primary Examiner* — Gary Gracia
(74) *Attorney, Agent, or Firm* — Soroker Agmon Nordman

(57) ABSTRACT

A method for requesting access rights for an object of a computerized system comprising installing in the computerized system a code that associates an object with an owner of the object, thereby enabling to automatically request access rights for the object from an owner of the object, and an apparatus for performing the same.

25 Claims, 3 Drawing Sheets

(56) References Cited

U.S. PATENT DOCUMENTS

| | | | |
|---|---|---|---|
| 2008/0201450 A1* | 8/2008 | Bong | G06F 9/468 709/219 |
| 2008/0235760 A1* | 9/2008 | Broussard et al. | 726/1 |
| 2008/0256458 A1* | 10/2008 | Aldred | G06F 21/6218 715/741 |
| 2008/0294641 A1* | 11/2008 | Kim | 707/9 |
| 2009/0125987 A1* | 5/2009 | Irwin | 726/4 |
| 2009/0150169 A1* | 6/2009 | Kirkwood | G06Q 10/00 705/342 |
| 2009/0157772 A1* | 6/2009 | Picon et al. | 707/203 |
| 2009/0164271 A1* | 6/2009 | Johnson | G06Q 20/123 705/344 |
| 2009/0228919 A1* | 9/2009 | Zott et al. | 725/34 |
| 2009/0282062 A1* | 11/2009 | Husic | 707/100 |
| 2009/0293105 A1* | 11/2009 | Urakawa | G06F 21/62 726/4 |
| 2009/0307775 A1* | 12/2009 | Brown | G06F 21/552 726/23 |
| 2010/0010998 A1* | 1/2010 | Wagner | G06F 21/6209 707/E17.01 |
| 2010/0011448 A1* | 1/2010 | Wagner | G06F 21/62 726/27 |
| 2010/0024011 A1* | 1/2010 | Fukuoka | 726/5 |
| 2010/0153483 A1* | 6/2010 | Offermann et al. | 709/203 |
| 2010/0262624 A1* | 10/2010 | Pullikottil | G06F 17/30336 707/783 |
| 2011/0040787 A1* | 2/2011 | Cierniak et al. | 707/770 |
| 2011/0040980 A1* | 2/2011 | Kerr et al. | 713/189 |
| 2011/0055207 A1* | 3/2011 | Schorzman et al. | 707/723 |
| 2011/0061111 A1* | 3/2011 | Faitelson | G06F 21/604 726/28 |
| 2011/0134471 A1* | 6/2011 | Kimura | 358/1.15 |
| 2011/0162040 A1* | 6/2011 | Stephens | G06F 21/6209 726/1 |
| 2011/0184989 A1* | 7/2011 | Faitelson | G06F 21/6218 707/784 |
| 2011/0247081 A1* | 10/2011 | Shelton | G06F 21/6218 726/28 |
| 2011/0282788 A1* | 11/2011 | Allison et al. | 705/44 |
| 2011/0302210 A1* | 12/2011 | Comanescu | 707/784 |
| 2011/0307695 A1* | 12/2011 | Slater | 713/163 |
| 2012/0131686 A1* | 5/2012 | Risan et al. | 726/32 |
| 2012/0150989 A1* | 6/2012 | Portnoy | G06F 17/30876 709/217 |
| 2012/0173981 A1* | 7/2012 | Day | G06F 3/04817 715/719 |
| 2012/0179541 A1* | 7/2012 | Pasila | G06Q 30/02 705/14.49 |
| 2012/0221561 A1* | 8/2012 | Brown et al. | 707/725 |
| 2012/0304306 A1* | 11/2012 | Chamarty | G06F 21/6209 726/28 |
| 2012/0331481 A1* | 12/2012 | Faludi | 719/313 |
| 2013/0091582 A1* | 4/2013 | Chen et al. | 726/26 |
| 2013/0212650 A1* | 8/2013 | Dabbiere et al. | 726/4 |

* cited by examiner

US 9,747,459 B2

METHOD AND APPARATUS FOR REQUESTING ACCESS TO FILES

RELATED APPLICATIONS

Reference is made to U.S. application Ser. No. 11/786,522, having an at least one common inventor with the present application, filed Apr. 12, 2007 and which is published as US2007/0244899, that reports methods and systems for decentralizing user data access rights control activities in networked organizations.

BACKGROUND

The present disclosure generally relates to requesting access rights to files, and more specifically to requesting access rights to files in an organization enterprise.

Generally, in an organization enterprise some users have access right for which other users do no have, yet, there might be occasions when a user wishes to access a file for which the user does not have access rights.

SUMMARY

One exemplary embodiment of the disclosed subject matter is a method for requesting access rights for an object of a computerized system comprising installing in the computerized system a code that associates an object with an owner of the object, thereby enabling to automatically request access rights for the object from an owner of the object, wherein the method is carried out by an at least one computer of the computerized system.

Another exemplary embodiment of the disclosed subject matter is an apparatus for requesting access rights for an object comprising an at least one computer having a program, the program configured with a code that associates an object with an owner of the object, thereby enabling to automatically request access rights for the object from an owner of the object, and a pointing device.

In the context of the present disclosure, without limiting, the term 'enterprise' implies a computerized system comprising a plurality of computers communicating therebetween and having and/or sharing a data storage, where the enterprise is also referred to as a 'computerized system' and the data storage also referred to as a 'storage'.

The communications between the computes may be direct and/or indirect. The data storage comprises one or more data storage devices.

Generally, without limiting, an enterprise comprises several computers in a range between about 10 computers and about 1000 computers or more. Optionally, an enterprise comprises less than 10 computers, not precluding having one computer as, for example, a mainframe computer.

Without limiting, in the context of the present disclosure with respect to an enterprise, the term 'object' implies a data object, such as a file or folder, stored on the storage of the enterprise and also referred to as an object of the enterprise.

In the context of the present disclosure, without limiting, the term 'user' or 'operator' implies a person, and/or a program operating on behalf of the person, that uses a resource of an enterprise, such as a computer of the enterprise. A user or operator is also referred to as user of the enterprise or operator of the enterprise, respectively.

In the context of the present disclosure, without limiting, the term 'access right' or 'rights' or 'sufficient rights' imply authorization for a user to access an object of an enterprise, whereas insufficient rights imply not having an authorization to access the object such as for opening or reaching the object for viewing. Referring generally or collectively to permissions implies any kind of authorization including, possibly, sufficient and/or insufficient rights.

Generally and without limiting, the authorization or permissions, and/or other properties of objects such as classifications, are set by the management or administration of the enterprise and/or by owners of objects of the enterprise and/or by operators with special high level authorization, also known as super-users or administrators.

In the context of the present disclosure, without limiting, the term 'owner' of an object implies a user that has authority and/or access rights to an object so that he or she may grant or authorize access to the object to users not having sufficient rights for the object. Without limiting, a person and/or a program and/or any entity operative or operating on behalf on an owner of an object and authorized to grant rights to the object is also considered or regarded as the owner. The access may be granted on an ad-hoc basis or any other basis such as time-limited, user dependent of permanently.

In the context of the present disclosure, without limiting, the terms 'conveniently' or 'handily' imply, with respect to an operation, at least partly automating an operation thereby precluding and/or eliminating specific manual actions.

The terms cited above denote also inflections and conjugates thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Figure 1:
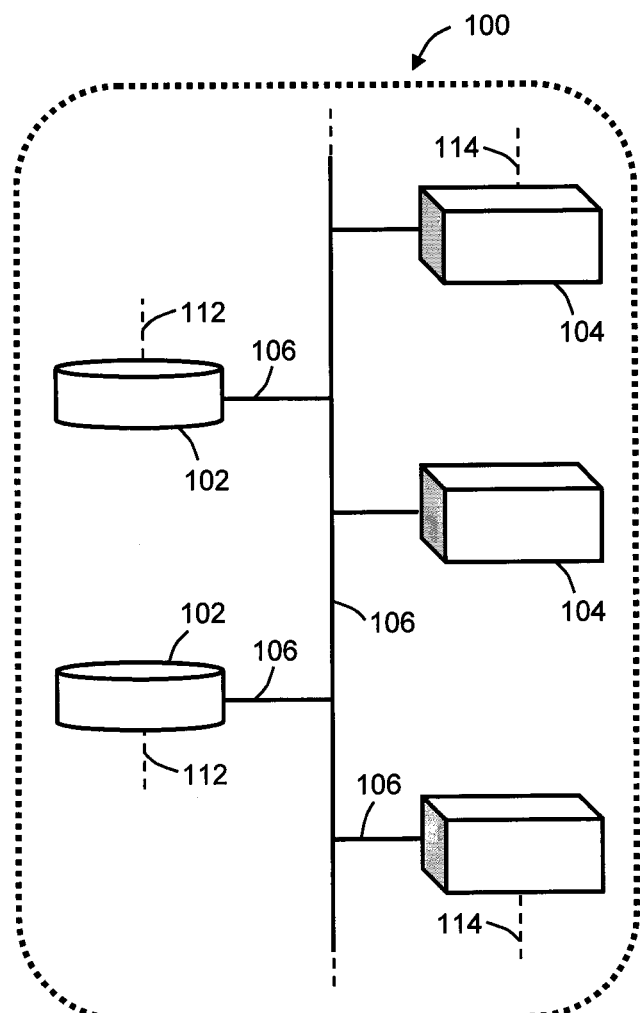

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
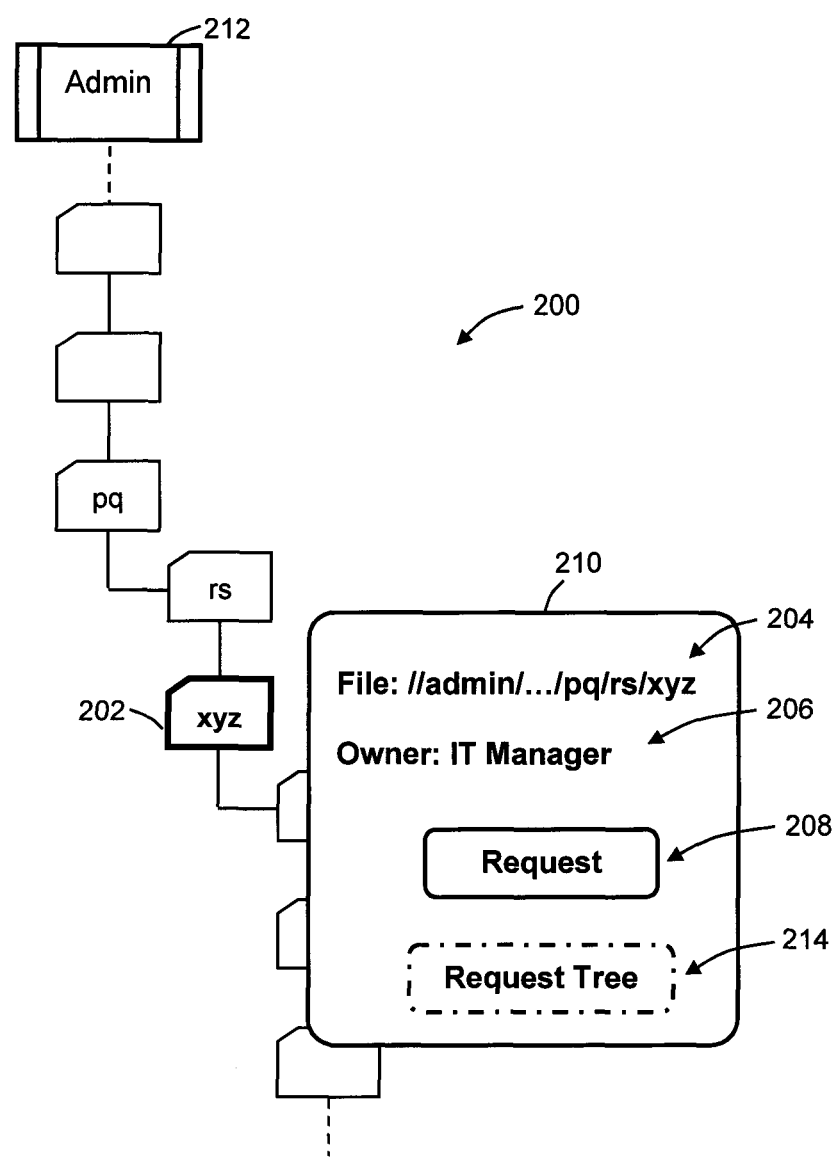
Figure 3A:
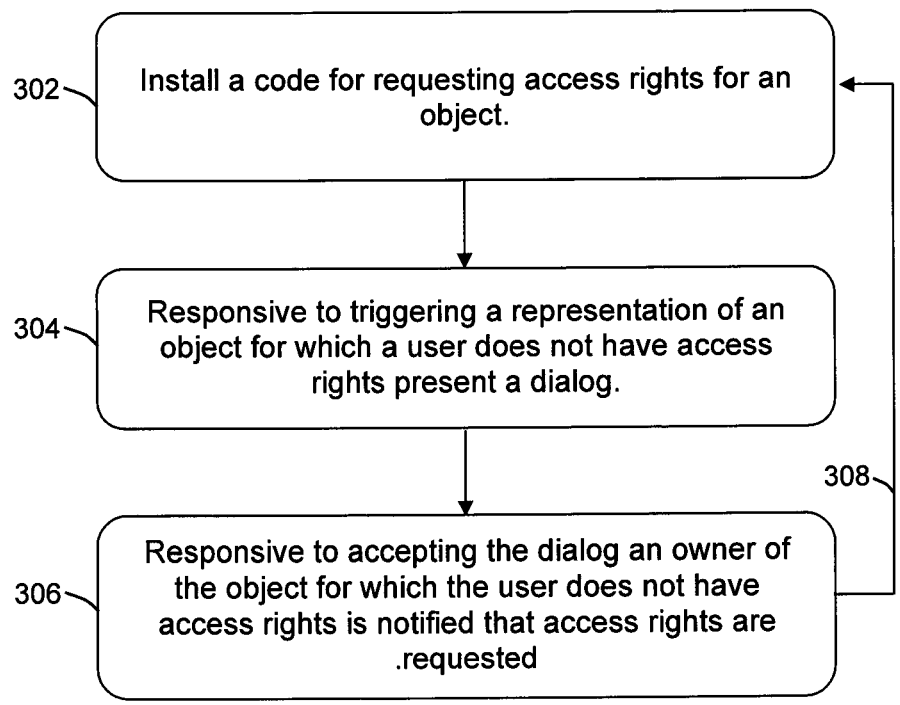
Figure 3B:
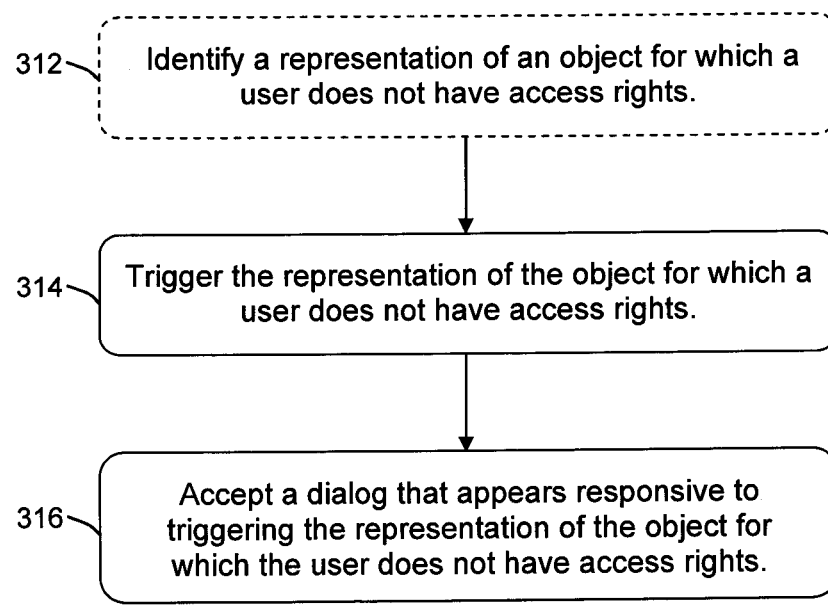

FIG. 1 schematically illustrates an enterprise comprising one or more computers, illustrated as three computers representing any number of computers, according to exemplary embodiments of the disclosed subject matter;

FIG. 2 schematically illustrates a display of a tree structure of objects in an enterprise accompanied by a pop-up dialog for rights request, according to exemplary embodiments of the disclosed subject matter;

FIG. 3A outlines operations for requesting access rights for an object for which a user does not have access rights, according to exemplary embodiments of the disclosed subject matter; and FIG. 3B outlines operations by a user requesting access rights for and object for which the user does not have access rights, according to exemplary embodiments of the disclosed subject matter.

DETAILED DESCRIPTION

Generally, prior to the disclosed subject matter, when a user operating a device of an enterprise encountered an object in an enterprise, such as when searching for the object or exploring a tree structure of objects, in case the user did not have access rights to the object the user had to contact the owner of the objects and request access rights to the object. This involved finding contact information of the owner, such as an email address, and sending an identification of the object and requesting access rights. Further, generally, a user does not know who an owner of an object is, and thus cannot find the contact information of the owner.

One technical problem dealt by the disclosed subject matter is handily requesting access rights to an object of an enterprise responsive to encountering the object for which the user does not have access rights, which for brevity is also referred to, without limiting, as a 'forbidden object'.

One technical solution according to the disclosed subject matter is a computer operating a program configured to present, such as on a display device, a presentation structure adapted for requesting access rights to an object upon triggering or activation a forbidden object.

In some embodiments, the presentation structure or a component of a user-interface or a graphical-user-interface (GUI), such as a dialog-box, a form, or any other presentation structure such as a button. For brevity and clarity, without limiting and unless otherwise specified, the presentations structure is also referred to a 'dialog' or a 'pop-up dialog'.

In some embodiments, the dialog is formed such that the user can accept the dialog, for example, by clicking on a 'OK' button in the dialog, or by any other way such as double-click on the dialog.

Responsive to accepting the dialog, the owner of the object is notified such a by sending an email to the owner, and, consequently, the owner may grant access rights for the objects to the user.

A potential technical effect of the disclosed subject matter is a convenient handy method for automatically requesting access rights for a forbidden object in an enterprise responsive to browsing objects of the enterprise.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

According to the disclosed subject matter, in order to request access rights for a forbidden object by a user, the user does not have to identify the object and locate the owner of the object. Rather, a program or application or a filesystem of the enterprise is adapted by a separate program code, also referred to as a 'code', that associates objects with contact data of an owner thereof and further, optionally, with one or more other information such as identification of the object.

Thus, when the user encounters a forbidden object, by activation or triggering the encountered object, such as by pointing at the object and clicking with a dedicated mouse button, for example, a right button, a dialog is presented to the user by the code, for example, as a pop-up dialog.

For brevity and clarity, without limiting, referring to a presented object implies also and/or as an alternative, referring to a representation of the object and/or a link thereto, such as by a symbol that embeds a link to the object.

In some embodiments, the dialog presents identification of the object such as the full path thereof, and optionally the owner of the object. In some embodiments, responsive acceptance of the dialog, such as by an 'Enter' key, the owner is automatically informed or notified that the user requests access rights to the object, without the user having to perform the chores of locating the owner and identifying the object and requesting the access rights to the object.

In some embodiments, activation of the forbidden object automatically notifies the owner of the object that the user requests access rights to the object, without having to accept a dialog, and/or the dialog is presented for a certain time interval for feedback or confirmation that a request for access rights for the identified forbidden object was performed.

The activation of the forbidden object is based on the code, and involves pointing at the forbidden object by a pointing device such as a mouse or a finger with a touch screen. In some embodiments, the activation is customizable. For example, dedicated type such as a right-button of a mouse or double-click with a finger on a touch screen or a combination of keyboard key and a mouse button such as 'alt/left-button'.

In some embodiments, objects of the enterprise are related to owners thereof and their respective contact information such as in data structures, such as index or database, as part of the administrative data maintained in the enterprise. Accordingly, the association of the forbidden object with contact information of the owners is based on querying the administrative information of the enterprise.

The code is installed or integrated in the enterprise and/or part thereof such as a program by an installation procedure such as known in the art. Optionally or alternatively, the code is installed or integrated in the enterprise by a mechanism of a plug-in or an add-on such as known in the art. Optionally, the code is installed or integrated in the enterprise by a script such as Flash (Adobe Inc) or JavaScript (Oracle Inc.) or ActiveX (Microsoft Inc.).

Thus, by way of the code, a user may automatically request access rights from an owner of a forbidden object without knowing or being ignorant who the owner of the forbidden object is and/or contact information thereof.

In some embodiments, the owner of the object is notified, such as sending an email to the owner or any other method such as SMS, Instant Messaging, or a telephone call. In some embodiments, the owner grants the user access rights to the forbidden object by email or any other method such as SMS, Instant Messaging or by releasing the forbidden object via the enterprise facilities for access by the user, optionally for a certain time period and, optionally, notifying the user to that effect.

FIG. 1 schematically illustrates an enterprise 100 comprising one or more computers, illustrated as three instances of a computer 104, representing any number of computer 104, as indicated by dashed lines 114.

Enterprise 100 further comprises one or more data storage devices, illustrated as two instances of a data storage device 102, representing any number of data storage device 102, as indicated by dashed lines 112. Data storage device 102 generally stores objects or data entities such as files or database records or users definitions or similar elements, collectively referred to also as objects.

The instances of computer 104 are connected or linked or coupled therebetween and to the instances of data storage device 102, the connection or linkage illustrated and represented by a network 106.

FIG. 2 schematically illustrates a display of a tree structure 200 of objects in an enterprise, such as enterprise 100, accompanied by a pop-up dialog 210 for rights request, according to exemplary embodiments of the disclosed subject matter. The dashed lines in tree structure 200 indicate some, if any, continuation of the tree structure.

In some embodiments and/or cases, a user browsing the enterprise, such as in a server 212 denoted as 'Admin', may encounter a forbidden object 202, denoted as a file or folder 'xyz'.

By way of example, it is assumed that the user wishes to access forbidden object 202 for which the user does not have access rights. Thus, the user has to request access rights from the owner of forbidden object 202, not necessarily knowing who the owner is and/or how to contact the owner.

The user may activate or trigger forbidden object 202, such as by pointing with a mouse on forbidden object 202 and pressing right-button, and a pop-up dialog 210 is presented.

Pop-up dialog 210 comprises object identification 204 of forbidden object 202, and, optionally, also name 206 of the owner of forbidden object 202.

Having confirmed by identification 204 that indeed access rights are wanted for forbidden object 202, the user may accept the request by activating a button 208, denoted as 'Accept', such as by double-click on button 208 and/or pressing 'Enter' key. Having accepted the request, pop-up dialog 210 disappears.

Responsive to acceptance, the owner, such as 'IT Manager', receives a notification that the user has requested access to forbidden object 202, and the owner may provide the access rights for forbidden object 202 to the user.

In some embodiments, instead of and/or in addition to identification 204 of forbidden object 202, the representation of forbidden object 202 is highlighted such as in a special color or a texture or a pattern.

In some embodiments, the user is not allowed to know who the owner is, and in such a case, name 206 is not included in pop-up dialog 210.

Thus, in some embodiments, pop-up dialog 210 comprises only button 208.

In some embodiments, when forbidden object 202 is a folder comprising multiple objects, access rights for the whole or a part of sub-tree of objects in of forbidden object 202 may be requested, where, accordingly, pop-up dialog 210 comprises a button 214 denoted as 'Accept Tree'.

In some embodiments, a multiplicity of forbidden objects may be selected, for example, by repeatedly clicking by a left-button of a mouse, and subsequently triggering the multiplicity of forbidden objects such as by a right-button of a mouse. Responsively, a dialog appear, optionally comprising the identifications of the multiplicity of forbidden objects and further, optionally, the respective owners of the multiplicity of forbidden objects. Accepting the dialog the respective owners of the multiplicity of forbidden objects are notified that access rights are requested for the multiplicity of forbidden objects, and the owners may respond by providing the requested rights.

In some embodiments, responsive to activation or triggering an object for which a user has access rights no dialog appears, optionally with some indication such as a 'beep'. Optionally or alternatively, a dialog appears notifying the user that he or she does not have access rights to the object.

In some embodiments, triggering or activation the object comprises hovering on the object with a pointing device such as a mouse, without any further operation such as right-button click.

It is noted the when a touch screen is used, the pointing device includes a finger and/or other member of the user.

It is noted that, in some embodiments, the owner of a forbidden object should provide an explanation and/or rationale why the owner grant access rights to a forbidden object.

FIG. 3A outlines operations for requesting access rights for an object for which a user does not have access right, according to exemplary embodiments of the disclosed subject matter.

In operation 302 a code that enables or facilitates requesting access rights for an object, as by operation 304 and operation 306 below, is installed.

The code is installed in an enterprise, such a enterprise 100, in one or more of the programs of the enterprise such as file system thereof or any other program that can display and/or browse the objects of the enterprise, such as a search program.

In some embodiments, the code is installed as an add-on code or a plug-in code or a script and/or otherwise cooperating and/or integrated with the enterprise program and/or programs.

In operation 304 a dialog, such as a pop-up dialog, is presented responsive to triggering a representation of an object for which a user does not have access rights.

The triggering of the representation of the object may be carried out by pointing at the object such a by a mouse and applying a preset or a reserved operation such as right-button of a mouse.

In operation 306 responsive to accepting the dialog an owner of the object for which the user does not have access rights is automatically notified that access rights are requested.

In some embodiments, the code enables selecting a plurality of objects for which a user does not have access rights and accepting a dialog for the plurality of objects the owner or owners of the respective objects are notified that access rights are requested for the objects.

Once the code is installed, operation 304 and operation 306 may be repeated as indicated by an arrow 308.

FIG. 3B outlines operations by a user requesting access rights for an object for which the user does not have access rights, according to exemplary embodiments of the disclosed subject matter.

In operation 312 a user, optionally, identifies a representation of an object for which the user does not have access rights.

In operation 314 the user triggers the representation of the object for which a user does not have access rights. For example, pointing by a mouse the representation of the object and applying a preset or a reserved operation such as right-button of a mouse or hovering over the representation of the object.

In operation 316 the user accepts a dialog that appears responsive to triggering the representation of the object for which the user does not have access rights, thereby automatically notifying an owner of the object for which the user does not have access rights that access rights are requested by the user.

In some embodiments, the user may select a plurality of objects for which a user does not have access rights and in a similar manner request the owner or owners of the objects access rights thereto.

It is noted that by the methods and embodiments described herein a user may request access rights from an owner of an object wherein the user does not know who the owner is and, furthermore, optionally, the user is not allowed to know who the owner is and/or to know how to contact the owner.

It is noted that an enterprise, such as enterprise 100, is provided as an example, and the methods described herein may be used for any computerized system, including a single computer.

There is thus provided according to the present disclosure a method for requesting access rights for an object of a computerized system comprising installing in the computerized system a code that associates an object with an owner of the object, thereby enabling to automatically request access rights for the object from an owner of the object, wherein the method is carried out by an at least one computer of the computerized system.

In some embodiments, enabling to automatically request access rights for the object comprises enabling to automatically notify the owner responsive to triggering a presented representation of the object.

In some embodiments, wherein a user of the computerized system does not have access rights for the object.

In some embodiments, the user is ignorant who the owner of the object is.

In some embodiments, the user is ignorant about contact information of the owner.

In some embodiments, triggering the presented representation of the object comprises pointing by a pointing device at the presented representation of the object.

In some embodiments, triggering the presented representation of the object further comprises operating the pointing device.

In some embodiments, notifying the owner comprises at least one of sending an email to the owner, sending SMS to the owner, instant messaging the owner, telephoning the owner, or any combination thereof.

In some embodiments, the code is at least one of an add-on program, a plug-in program, a script or any combination thereof.

In some embodiments, wherein associating the object with the owner of the object is based on data maintained in the computerized system.

There is thus yet provided according to the present disclosure an apparatus for requesting access rights for an object comprising an at least one computer having a program, the program configured with a code that associates an object with an owner of the object, thereby enabling to automatically request access rights for the object from an owner of the object, and a pointing device.

In some embodiments, enabling to automatically request access rights for the object comprises enabling to automatically notify the owner responsive to triggering a presented representation of the object.

In some embodiments, wherein a user of the apparatus does not have access rights for the object.

In some embodiments, the user is ignorant who the owner of the object is.

In some embodiments, the user is ignorant about contact information of the owner.

In some embodiments, triggering the presented representation of the object comprises pointing by the pointing device at the presented representation of the object.

In some embodiments, triggering the presented representation of the object further comprises operating the pointing device.

In some embodiments, notifying the owner comprises at least one of sending an email to the owner, sending SMS to the owner, instant messaging the owner, telephoning the owner, or any combination thereof.

In some embodiments, the code is at least one of an add-on program, a plug-in program, a script or any combination thereof.

In some embodiments, associating the object with the owner of the object is based on data maintained in the apparatus.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system such as a part program operating together with other parts on the same unit, or a program component operating on different unit, and a process represents a collection of operations for achieving a certain outcome.

The term "configuring" and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for requesting access rights for an object of a computerized system stored therein, comprising:

Installing, as an add-on in one or more programs for displaying or browsing objects stored in the computerized system, a code that associates an object that is stored in the computerized system with contact data of an owner of the object, wherein the association of the object with the contact data of the owner is based on querying administrative data maintained in the computerized system, and wherein the owner is a user that has authority to grant access to the object to users not having access rights for the object;

operating by a user of the computerized system a pointing device by at least aiming the pointing device on a visually presented representation of the object, where operating of the pointing device is independent of and without a dialog for the object selection and of any separately additional operating of the pointing device apart from said operation, the representation having a link to the object and presented in a structure amenable for browsing a plurality of representations of a plurality of respective objects that are stored in the computerized system;

consequently to operating the pointing device on the representation of the object then according to the link of the representation of the object directly and independently of any other interaction, automatically requesting for the user access rights for the object from the owner of the object by automatically notifying the owner based on the contact data of the owner of the object associated with the object by the code; and responsive to determining that the owner of the object granted the user the requested access rights to the object, automatically notifying the user that access has been granted;

wherein the method is carried out by an at least one computer of the computerized system;

wherein when the object is a folder comprising multiple objects, presenting a dialog to the user indicating that the user does not have access rights for the requested multiple objects, wherein the dialog comprises at least the multiple objects' identifications, and wherein operating the pointing device comprises hovering the pointing device over the presented representation of the object to automatically request for the user access rights for the multiple objects by automatically notifying respective owners of the multiple objects based on the contact data of the respective owners of each object associated with the object by the code; and wherein access rights are requested from the owners without the user having knowledge that the owner has been notified.

2. The method according to claim 1, wherein the user of the computerized system does not have access rights for the object.

3. The method according to claim 1, wherein the user is ignorant who the owner of the object is.

4. The method according to claim 1, wherein the user is ignorant about contact information of the owner.

5. The method according to claim 1, wherein operating the pointing device comprises pointing by the pointing device on the presented representation of the object and performing an action with the pointing device.

6. The method according to claim 1, wherein operating the pointing device comprises hovering the pointing device over the presented representation of the object.

7. The method according to claim 1, wherein notifying the owner comprises at least one of sending an email to the owner, sending SMS to the owner, instant messaging the owner, telephoning the owner, or any combination thereof.

8. The method according to claim 1, wherein the code is at least one of an add-on program, a plug-in program, a script or any combination thereof.

9. The method according to claim 1, wherein the pointing device comprises at least a part of a limb of a person.

10. The method according to claim 1, wherein operating the pointing device comprises pointing by the pointing device on the presented representation of the object and clicking with a least one button of the pointing device.

11. The method according to claim 1, wherein operating the pointing device comprises pointing by the pointing device on the presented representation of the object and at least pressing a key of a keyboard.

12. The method according to claim 1, wherein operating the pointing device comprises pointing by the pointing device on the presented representation of the object and clicking with a finger of the user.

13. The method according to claim 1, wherein access rights for the whole or a part of sub-tree of the multiple objects in the folder are requested.

14. An apparatus for requesting access rights for an object, comprising:

an at least one computer having a program, the program installed as an add-on code in one or more programs for displaying or browsing objects stored in a computerized system, the program configured with a code that associates an object that is stored in a storage device linked to the at least one computer with contact data of an owner of the object for:

enabling to automatically request by a user of the computerized system access rights for the object from an owner of the object responsive to operating a pointing device by at least aiming the pointing device on a visually presented representation of the object where the representation embeds a link to the object and is presented in a structure amenable for browsing a plurality of representations of a plurality of respective objects that are stored in the storage device of the computerized system, wherein operating of the pointing device is independent of and without a dialog for the object selection and of any separately additional operating of the pointing device apart from said operation, directly and independently of any other interaction automatically requesting for the user access rights for the object from the owner of the object by automatically notifying the owner based on the contact data of the owner of the object associated with the object by the code, and responsive to determining that the owner of the object granted the user the requested access rights to the object, automatically notifying the user that access has been granted;

wherein the association of the object with the contact data of the owner is based on querying administrative data maintained in the computerized system;

wherein the owner is a user that has authority to grant access to the object to users not having access rights for the object;

wherein the program is further configured to automatically request access rights for the object by automatically notifying the owner responsive to operating on said representation of the object;

wherein when the object is a folder comprising multiple objects, presenting a dialog to the user indicating that the user does not have access rights for the requested multiple objects, wherein the dialog comprises at least the multiple objects' identifications, and wherein operating the pointing device comprises hovering the pointing device over the presented representation of the object to automatically request for the user access rights for the multiple objects by automatically notifying respective owners of the multiple objects based on the contact data of the respective owners of each object associated with the object by the code; and wherein access rights are requested from the owners without the user having knowledge that the owner has been notified.

15. The apparatus according to claim 14, wherein the user of the apparatus does not have access rights for the object.

16. The apparatus according to claim 14, wherein the user is ignorant who the owner of the object is.

17. The apparatus according to claim 14, wherein the user is ignorant about contact information of the owner.

18. The apparatus according to claim 14, wherein operating the pointing device on the presented representation of the object comprises pointing by the pointing device on the presented representation of the object and performing an action with the pointing device.

19. The apparatus according to claim 14, wherein operating the pointing device comprises hovering the pointing device over the presented representation of the object.

20. The apparatus according to claim 14, wherein notifying the owner comprises at least one of sending an email to the owner, sending SMS to the owner, instant messaging the owner, telephoning the owner, or any combination thereof.

21. The apparatus according to claim 14, wherein the code is at least one of an add-on program, a plug-in program, a script or any combination thereof.

22. The apparatus according to claim 14, wherein the pointing device comprises at least a part of a limb of a person.

23. The apparatus according to claim 14, wherein operating the pointing device comprises pointing by the pointing device on the presented representation of the object and clicking with a least one button of the pointing device.

24. The apparatus according to claim 14, wherein operating the pointing device comprises pointing by the pointing device on the presented representation of the object and at least pressing a key of a keyboard.

25. The apparatus according to claim 14, wherein operating the pointing device comprises pointing by the pointing device on the presented representation of the object and clicking with a finger of the user.

* * * * *